United States Patent [19]

Agrawal

[11] Patent Number: 4,852,979

[45] Date of Patent: Aug. 1, 1989

[54] ENCAPSULATED ELECTROCHROMIC MIRROR AND METHOD OF MAKING SAME

[75] Inventor: Anoop Agrawal, Holland, Mich.

[73] Assignee: Donnelly Corporation, Holland, Mich.

[21] Appl. No.: 79,764

[22] Filed: Jul. 30, 1987

[51] Int. Cl.⁴ .............................. G02F 1/01; G02F 1/17
[52] U.S. Cl. ..................................................... 350/357
[58] Field of Search ....................... 350/357, 353, 355; 252/408.1, 600

[56] References Cited

U.S. PATENT DOCUMENTS

| | | | |
|---|---|---|---|
| 4,227,779 | 10/1980 | Bissar et al. | 350/357 |
| 4,303,310 | 12/1981 | Morita et al. | 350/357 |
| 4,379,619 | 4/1983 | Kuwagaki et al. | 350/357 |
| 4,392,720 | 7/1983 | Ganguillet et al. | 350/357 |
| 4,403,831 | 9/1983 | Amano | 350/334 |
| 4,457,586 | 7/1984 | Sharp et al. | 350/281 |
| 4,465,339 | 8/1984 | Baucke et al. | 350/357 |
| 4,482,216 | 11/1984 | Hashimoto et al. | 350/357 |
| 4,575,190 | 3/1986 | Wood et al. | 350/357 |
| 4,664,934 | 5/1987 | Ito et al. | 427/38 |
| 4,726,664 | 2/1988 | Tada et al. | 350/357 |

FOREIGN PATENT DOCUMENTS

| | | | |
|---|---|---|---|
| 54-100759 | 8/1979 | Japan . | |
| 55-100529 | 7/1980 | Japan . | |
| 56-12624 | 2/1981 | Japan . | |
| 58-58523 | 4/1983 | Japan . | |
| 0091431 | 5/1983 | Japan | 350/357 |
| 0211123 | 12/1983 | Japan | 350/357 |

Primary Examiner—Eugene R. LaRoche
Assistant Examiner—Nathan W. McCutcheon
Attorney, Agent, or Firm—Price, Heneveld, Cooper, DeWitt & Litton

[57] ABSTRACT

Electrochromic mirrors are protected against environmental and mechanical damage by an encapsulant system comprising a shatterproofing backing and a hermetic seal. The shatterproofing backing entirely covers the surfaces of the electrochromic cell elements and is itself entirely covered by the hermetic seal.

8 Claims, 1 Drawing Sheet

ENCAPSULATED ELECTROCHROMIC MIRROR AND METHOD OF MAKING SAME

BACKGROUND OF THE INVENTION

This invention relates to electrochromic devices, especially electrochromic mirrors. More specifically, the invention relates to an improved electrochromic mirror which is characterized by its resistance to environmental and mechanical damage and to the making of such improved mirrors.

Electrochromic devices per se are known. Typically, such devices comprise thin layers of inorganic oxides that change color upon the application of an electric field, maintain the changed condition after the field is switched off, and return to the original state after pole reversal. Examples of electrochromic materials are tungsten trioxide and molybdenum trioxide, which are colorless and transparent when applied as thin layers onto a glass substrate or carrier. When a suitable voltage is applied to the layer, cations migrate from one side and electrons migrate from the other side to form the colored tungsten or molybdenum bronzes, as the case may be. The color intensity is a function of the amount of applied charge.

Electrochromic devices have been proposed for a variety of applications, including electro-optic displays such as electronic watches and for intentionally darkening optical glasses or mirrors. Electrochromic mirrors are described, for example, in U.S. Pat. Nos. 3,712,710; 3,844,636 and 4,465,339.

Electrochromic mirrors typically comprise a transparent conductive coating deposited on a piece of glass, followed by the sequential deposition of a number of active layers, and finally a conductive layer of aluminum, stainless steel or silver which can also function as a reflective surface. The active layers and aluminum, if used as a reflective surface, are sensitive to moisture and oxygen, with the efficiency and aging characteristics of the electrochromic cell being particularly responsive to water content. In addition, the various layers which make up the cell are sufficiently soft and fragile that they can be readily scratched or otherwise mechanically damaged, thereby negatively affecting optical properties of the mirror. When used as mirrors in the interior of automobiles, electrochromic mirrors have to be protected from impact. The shattered pieces of glass should be contained in the mirror casing to avoid injury to the occupants of the vehicle, either from shards of glass or leakage of corrosive materials from the electrochromic cells, some of which may contain acidic or basic liquid electrolytes.

Japanese Application No. 58-91431(A) discloses a solid state electrochromic display cell, comprising a series of thin films deposited onto a glass substrate which is sealed to protect the device from the ambient environment by covering the exposed surfaces of the thin films with a xylene polymer, which is itself covered with a reaction curing-type resin such as an epoxy resin to which a solid protecting plate can be adhered.

Baucke et al U.S. Pat. No. 4,465,339 discloses hermetically sealed electrochromic mirrors using an adhesive, such as an epoxide adhesive, applied over the stack of thin films deposited onto a transparent glass substrate, preferably in combination with a solid glass, plastic or metal backing plate adhered to the adhesive film.

Ganguillet et al U.S. Pat. No. 4,392,720; Bissar et al U.S. Pat. No. 4,227,779 and Amano U.S. Pat. No. 4,403,831 also disclose the use of adhesive resin or solder joints to seal the working elements of electrochromic display devices from the ambient environment.

While such techniques can be effective in hermetically sealing electrochromic devices from environmental factors, such as fluctuations in humidity, they are much less effective in protecting such devices from mechanical factors, such as impact loadings, because of the hard, brittle character typically exhibited by hermetic seal materials. In addition, the hard coatings can introduce stresses in thin films when applied directly onto the films.

SUMMARY OF THE PRESENT INVENTION

In accordance with the present invention, there is provided an encapsulant system especially adapted to protect electrochromic mirrors against environmental and mechanical damage, in which the exposed surfaces of the electrochromic cell being entirely covered by a shatterproofing material which is in contact with and adhered to the glass substrate. The shatterproofing material is itself entirely covered with a hermetic sealing means, which is also in contact with and adhered to the glass substrate. The shatterproofing backing effectively protects the mirror from mechanical damage and breakage which may result therefrom. The hermetic seal effectively protects the mirror from environmental factors, such as intrusion or loss of moisture and entry of oxygen but is generally not effective to provide protection against mechanical damage.

These and other objects, advantages and features of the invention will be more fully understood and appreciated by reference to the written specification and appended drawings.

DESCRIPTION OF THE PREFERRED EMBODIMENT

Figure 1:
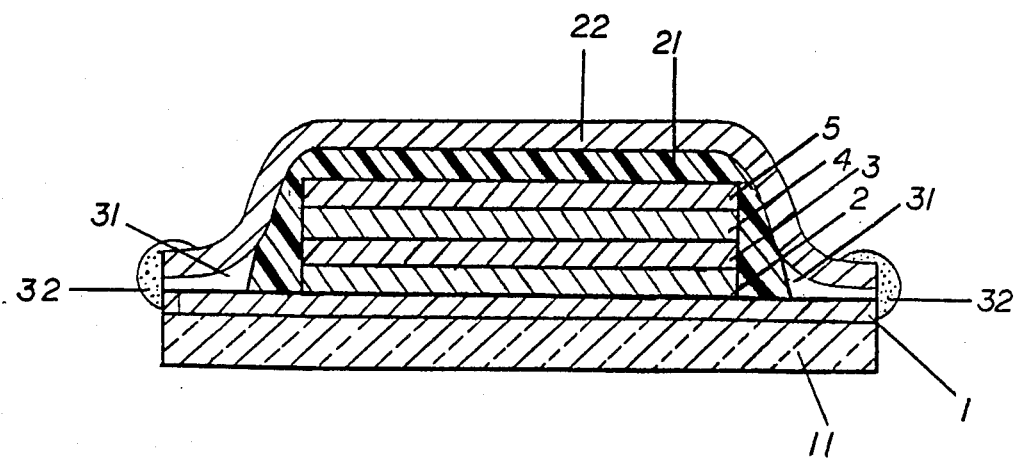
FIG. 1 is a schematic representation of a cross section of an electrochromic mirror made in accordance with the present invention.

In the preferred embodiment, it has been determined that encapsulant systems which are effective to protect electrochromic mirrors from environmental and mechanical damage without impairing the operation of such mirrors should provide the following:

(a) Substantially hermetic seal against moisture and oxygen.

(b) Shatterproofing.

(c) Good material processability, including easy to apply, low toxicity and low application temperature, preferably below 60° C. In this regard, localized heating in noncritical areas, such as at the periphery of the device, may be permitted, provided the cell itself is not affected. It is generally preferred that the temperature of the cell itself not be allowed to exceed 60° C. During processing, no volatile matter should be evolved as such materials may become trapped inside the encapsulated regions and could negatively affect performance of the mirror.

(d) The encapsulant material in contact with the mirror should be hydrophobic in nature to avoid either introduction or extraction of moisture to or from the completed mirror. This encapsulant material should also be free of any ionic impurities to eliminate the interference of such foreign ions with the working ions present in the mirror. This material when applied as a thick film should have a low mechanical modulus and low shrinkage during processing to minimize stress build-up on the electrochromic layers. To provide a shatterproofing capability, the encapsulant material should be comparatively soft, have a high elongation to failure (greater than 100%) and have at least fair adhesion to the front substrate.

(e) The encapsulant system should retain its properties and function over a temperature range at least from −40° C. to 80° C.

(f) The encapsulating materials should not interfere with the functional (electrical) characteristics of the mirror and should preserve its cosmetic appearance.

The preferred embodiment of the invention is an electrochromic mirror substantially completely protected against environmental and mechanical damage comprising a plurality of solid state thin films 1–5 deposited onto a glass substrate 11, wherein the thin films are isolated from the ambient environment by an encapsulant comprising a shatterproofing backing 21 and an hermetic backing 22, said hermetic backing 22 encapsulating said shatterproof backing 21 and being adhesively secured to the conductive layer 1 on the rear side of said glass substrate 11 at the outer peripheries of backing 22 and substrate 11 by primary adhesive 31, with the entire assembly being further sealed at the primary adhesive glue line by a bead of secondary adhesive 32 extending from the front side of glass substrate 11 to the backside of hermetic backing 22 across the glue line formed by primary adhesive 22.

The mirror stack comprising glass substrate 11 and solid films 1–5 is formed by sequentially depositing each of the thin solid films by any of several different techniques, including vacuum deposition, sputtering, evaporation, solution dipping, spinning, spraying and the like. The glass substrate 11 is typically 1 to 3 mm in thickness, and most preferably has a thickness of 2 mm. Typically, the mirror stack is formed by depositing a transparent conductive layer 1 entirely over one of the glass substrate 11. The conductive layer 1 comprises an electrically conductive coating, such as indium-tin oxide, tin oxide, tin oxide doped with antimony or fluorine, or cadmium stannate. The conductive layer is sufficiently thick to provide excellent conductivity across its entire surface (sheet resistance typically 10–15 ohms/square) and yet is sufficiently thin that it does not excessively darken the mirror. The conductive layer is generally from about 300 to 1200 angstroms in thickness, with a thickness of about 1600 angstroms being currently preferred.

Deposited onto conductive layer 1, except for a perimeter strip along its marginal edge, is a first electrochromic layer 2. Electrochromic layer 2 is preferably an anodic electrochromic material which will color when positively charged. Preferably, electrochromic layer 2 comprises nickel hydroxide. Other suitable anodic electrochromic materials include iridium oxide, rhodium oxide and cobalt oxide. The electrochromic layer is usually from 100–1000 angstroms in thickness, with thicknesses of 300–600, especially 400, angstroms being preferred.

The next layer to be deposited is a solid electrolyte or ion donor layer 3. Since the electrolyte layer 3 serves to isolate anodic electrochemical layer 4, layer 3 must be ion conducting, electron insulating, clear and must remain clear during bleaching of the electrochromic layers. Suitable materials include tantalum pentoxide, cesium oxide, aluminum oxide, magnesium fluoride, silicon dioxide and mixtures thereof, with tantalum pentoxide being currently preferred. The electrolyte layer typically has a thickness in the range from 750 to 2000, preferably 1000 to 1500, most preferably 1300, angstroms.

Electrochromic layer 4 is a cathodic electrochromic material, preferably tungsten oxide. Other useful cathodic electrochromic materials include molybdenum oxide, tungsten oxide-molybdenum oxide mixtures, niobium pentoxide, titanium pentoxide and vanadium pentoxide. Cathodic electrochromic materials color when negatively charged. When the mirror stack is subjected to an appropriate potential difference, both the anodic and the cathodic electrochromic layers will color. The electrochromic layers have a memory and hence retain their colored condition even after the potential is removed. When the potential is reversed, both layers will clear or bleach and retain that condition even after the charge is removed. The thickness of the cathodic electrochromic layer is in the range from 500 to 6000, preferably 600–1200, and most preferably 800, angstroms.

Finally, conductive/reflective layer 5 is applied. Preferably, it is aluminum. Other suitable materials include palladium, platinum, titanium chromium, silver and stainless steel. Layer 5 serves a dual purpose, it reflects incident light and conducts electricity to the cathodic electrochromic layer. The thickness of the conductive layer is in the range from 250 to 2000, preferably 1000–1500, and most preferably 1000, angstroms.

In accordance with this invention, the mirror stacks are protected from environmental and mechanical damage by covering the solid state thin films 1–5 over their entire exposed surface with a shatterproofing backing 21, said shatterproofing backing 21 extending to and affixed to at least that side of the glass substrate 11 upon which the solid state thin films 1–5 are deposited. Reference to affixing or adhering the shatterproofing backing 21 to glass substrate 11 is intended to include affixing to the conductive coating 1 on the back side thereon, as shown in the drawing. The shatterproof backing is typically a soft polymeric layer characterized by hydrophobicity, low modulus, fair adhesion to the exposed surface of substrate 11 or coating 1 thereon, is processible at temperatures below 60° C., maintains its properties at least in the temperature range of −50° to +100° C., does not release volatiles during processing, has almost zero shrinkage and no ionic impurities. Generally, shatterproof backing 21 will be deficient in hermetic characteristics because of the high diffusion coefficient of gases and vapors through polymers in their soft or rubbery state. Suitable materials for forming the shatterproof backing include natural and synthetic rubber latexes, polyurethanes, cellulose acetate butyrate and curable silicone rubbers. Room temperature curing silicone rubbers are currently preferred.

Hermetic backing 22 is then applied over the entire exposed surface of shatterproof backing 21 and onto the outer periphery of substrate 11 to hermetically seal backing 21 and the solid state thin films 1–5 from the ambient environment, thereby minimizing the transport of water to or from the electrochromic layers. Suitable materials for forming the hermetic backing include metallic foil, films of glassy or crystalline hydrophobic polymers and combinations. Especially preferred polymeric films are polyolefins, polyester and polyvinylidene chloride. Aluminum foil is the currently preferred backing. In some applications, it may be desirable to use another glass plate or a ceramic member as the hermetic backing 22 to impart more rigidity to the mirror assembly or to mount other components such as circuits.

To insure the obtainment of a hermetic seal at those areas of the periphery of glass substrate which are in contact with either or both of shatterproof backing 21 and hermetic backing 22, primary hermetic adhesive 31 is utilized to bond backing 22 to substrate 11. The thickness of the adhesive glue line should be kept to a minimum so that water and oxygen do not pass through it. To minimize the escape of water originally present in and necessary for proper functioning of the electrochromic mirror, the adhesive should itself be moisture resistant and hard over the temperature range at which the mirror is to operate. During processing, no volatiles should be evolved and the processing temperature should be low, preferably not above 60° C. Since hermetic adhesive 31 is at the periphery of the mirror and does not contact the electrochromic stack (thin films 1–5), higher temperatures up to 200° C. may be utilized at the periphery for short periods during processing, with the electrochromic stack itself being kept preferably below 60° C. The primary adhesive 31 may be polymeric, metallic, organic or organometallic and should have good adhesion to the glass substrate 11 and the hermetic backing 22. Suitable primary adhesives include silicones, epoxies, polyesters, acrylics, metal solders and ceramic cements. Currently, epoxy adhesives are preferred.

Finally, there is applied secondary adhesive 32. Secondary adhesive 32 is preferably applied around the outer perimeter of substrate 11 and extending from the front side of substrate 11 to the backside of hermetic backing 22 and covering the entire glue line formed by adhesive 31, thereby completing the isolation of the solid state thin films 1–5 from the ambient environment. Secondary adhesive 32 is typically a low viscosity solution, emulsion or varnish that supplements the water barrier properties of adhesive 31 and also seals off any cracks or voids that may remain from the application of primary adhesive 31. Secondary adhesive 32 should have good adhesion to substrate 11, primary adhesive 31 and hermetic backing 22. Suitable secondary adhesive materials include silicones, polyvinylidene chloride emulsions, polyesters, acrylics and cross-linking varnishes containing silanes and titanates. Currently preferred secondary adhesives are polyvinylidene chloride emulsions and the cross-linking varnishes.

Of course, it is understood that the foregoing is merely a preferred embodiment of the invention and that various changes and alterations can be made without departing from the spirit and broader aspects thereof.

The embodiments of the invention in which an exclusive property or privilege is claimed are defined as follows.

1. An electrochromic mirror which can be alternatively darkened or lightened to decrease or increase reflectivity comprising a glass substrate; an electrochromic cell; and a coating suitable to protect said electrochromic mirror from environmental and mechanical damage comprising a shatterproofing coating in contact with and adhered to said glass substrate and substantially covering the exposed surfaces of said electrochromic cell and a hermetically sealing coating covering the entire exposed surface of said shatterproofing coating and being in contact with and adhered to said substrate.

2. An electrochromic mirror in accordance with claim wherein said hermetically sealing coating is adhesively joined to said glass substrate by a hermetic primary adhesive.

3. An electrochromic mirror in accordance with claim comprising a bead of secondary adhesive around the outer periphery of said mirror, said secondary adhesive extending from the front side of said glass substrate to the backside of said hermetically sealing covering across the entire hermetic coating-glass substrate glue line.

4. An electrochromic mirror which can be alternatively darkened or lightened to decrease or increase reflectivity comprising a glass substrate and an electrochromic cell; said electrochromic cell comprising:
  (a) a conductive layer on at least one surface of said glass substrate;
  (b) a first electrochromic material in abutting relationship with said conductive layer, said first electrochromic material being one of an anodic electrochromic layer and a cathodic electrochromic layer;
  (c) a solid electrolyte layer in abutting relationship to said first electrochromic material;
  (d) a second electrochromic material in abutting relationship with said electrolyte layer, said second electrochromic material being the other of said anodic electrochromic layer and cathodic electrochromic layer;
  (e) a layer of reflective and conductive material in abutting relationship with said electrochromic material; and
  (f) a coating suitable to protect said electrochromic mirror from environmental and mechanical damage, said coating comprising a shatterproofing coating in contact with and adhered to said glass substrate and substantially covering the exposed surfaces of said electrochromic cell and a hermetically sealing coating covering the entire exposed surface of said shatterproofing coating and being in contact with and adhered to said glass substrate.

5. An electrochromic mirror in accordance with claim 4 wherein said hermetically sealing coating is adhesively joined to said glass substrate by a hermetic primary adhesive.

6. An electrochromic mirror in accordance with claim 5 comprising a bead of secondary adhesive around the outer periphery of said mirror, said secondary adhesive extending from the front side of said glass substrate to the backside of said hermetically sealing covering across the entire hermetic coating-glass substrate glue line.

7. A method for hermetically sealing an electrochromic mirror comprising a transparent glass substrate having deposited on at least one surface thereof a transparent conductive coating; a first electrochromic material being one of an anodic electrochromic layer or a cathodic electrochromic layer being deposited on said conductive coating; a layer of solid electrolyte material being deposited on said first electrochromic material; a second electrochromic material being deposited on said solid electrolyte layer, said second electrochromic material being the other of said anodic electrochromic layer or said cathodic electrochromic layer; and a layer of reflective and conductive material in contact with said second electrochromic material, said method comprising:
  covering the exposed surfaces of said transparent conductive coating, said first electrochromic material, said solid electrolyte material, said second electrochromic material and said reflective/conductive material with a shatterproofing material;

covering said shatterproofing material with a hermetic sealing layer, said hermetic layer being in contact with said glass substrate at its outer periphery; and adhesively sealing said hermetic layer to said glass substrate at the outer peripheries of each.

8. A method according to claim 7 wherein the glue line formed by adhesively sealing said hermetic layer to said glass substrate is further sealed by applying a bead of secondary adhesive around the entire outer periphery of said electrochromic mirror, said bead extending from the front side of said glass substrate to the backside of said hermetic layer across the entire hermetic layer-glass substrate glue line.

* * * * *

UNITED STATES PATENT AND TRADEMARK OFFICE
CERTIFICATE OF CORRECTION

PATENT NO. : 4,852,979

DATED : August 1, 1989

INVENTOR(S) : Anoop Agrawal

It is certified that error appears in the above-identified patent and that said Letters Patent is hereby corrected as shown below:

Column 6, Claim 2, Line 2:

Before "wherein" insert --1--.

Column 6, Claim 3, Line 2:

Before "comprising" insert --2--.

Signed and Sealed this

Tenth Day of September, 1991

Attest:

HARRY F. MANBECK, JR.

Attesting Officer

Commissioner of Patents and Trademarks